(12) United States Patent
Nichol

(10) Patent No.: US 9,243,311 B2
(45) Date of Patent: Jan. 26, 2016

(54) METHOD FOR REMOVING PHOSPHOROUS AND BORON FROM ALUMINIUM SILICON ALLOY FOR USE IN PURIFYING SILICON

(75) Inventor: Scott Nichol, Toronto (CA)

(73) Assignee: Silicor Materials Inc., San Jose, CA (US)

( * ) Notice: Subject to any disclaimer, the term of this patent is extended or adjusted under 35 U.S.C. 154(b) by 663 days.

(21) Appl. No.: 12/530,993

(22) PCT Filed: Mar. 13, 2008

(86) PCT No.: PCT/CA2008/000499
§ 371 (c)(1),
(2), (4) Date: Mar. 3, 2010

(87) PCT Pub. No.: WO2008/110012
PCT Pub. Date: Sep. 18, 2008

(65) Prior Publication Data
US 2010/0254879 A1    Oct. 7, 2010

Related U.S. Application Data

(60) Provisional application No. 60/894,587, filed on Mar. 13, 2007.

(51) Int. Cl.
| C01B 33/037 | (2006.01) |
| C22C 21/02 | (2006.01) |
| C22B 21/06 | (2006.01) |
| C22C 3/00 | (2006.01) |

(52) U.S. Cl.
CPC ............... *C22C 21/02* (2013.01); *C01B 33/037* (2013.01); *C22B 21/06* (2013.01); *C22B 21/064* (2013.01); *C22C 3/00* (2013.01)

(58) Field of Classification Search
None
See application file for complete search history.

(56) References Cited

U.S. PATENT DOCUMENTS

| 3,069,240 | A |  | 12/1962 | Armand |  |
| 4,241,037 | A | * | 12/1980 | Pelosini et al. | ............... 423/348 |
| 4,312,848 | A |  | 1/1982 | Dawless |  |
| 4,312,849 | A | * | 1/1982 | Kramer | ........................ 423/348 |
| 4,539,194 | A | * | 9/1985 | Halvorsen | ..................... 423/348 |
| 5,310,412 | A | * | 5/1994 | Gilbert et al. | .................. 75/571 |
| 6,036,932 | A | * | 3/2000 | Hongu et al. | ................. 423/348 |
| 6,488,743 | B1 | * | 12/2002 | Venås et al. | ..................... 95/246 |
| 2005/0139148 | A1 | * | 6/2005 | Fujiwara et al. | ................ 117/13 |

FOREIGN PATENT DOCUMENTS

WO    WO-2007112592 A1    10/2007

OTHER PUBLICATIONS

"International Application Serial No. PCT/CA2008/000499, Search Report mailed Jul. 8, 2008", 6 Pgs.
"International Application Serial No. PCT/CA2008/000499, Written Opinion mailed Jul. 8, 2008", 5 Pgs.

* cited by examiner

*Primary Examiner* — Melvin C Mayes
*Assistant Examiner* — Stefanie Cohen
(74) *Attorney, Agent, or Firm* — Schwegman Lundberg & Woessner, P.A.

(57) ABSTRACT

Embodiments of the present invention relate to a process for purifying silicon by removing one or both of phosphorus and boron.

23 Claims, 1 Drawing Sheet

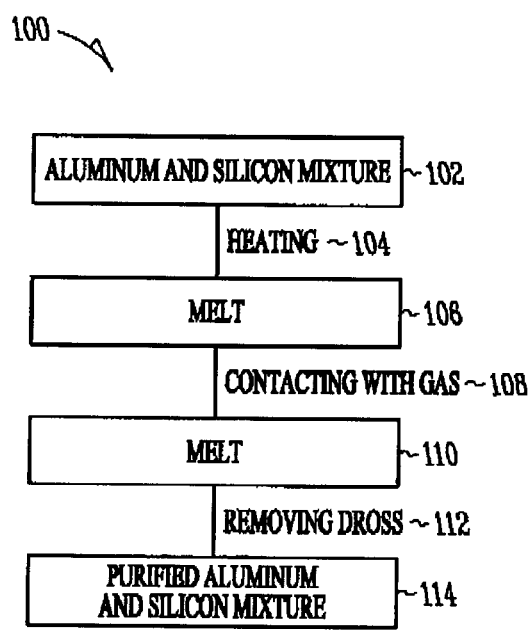

METHOD FOR REMOVING PHOSPHOROUS AND BORON FROM ALUMINIUM SILICON ALLOY FOR USE IN PURIFYING SILICON

PRIORITY OF INVENTION

This non-provisional application is a U.S. National Stage Filing under 35 U.S.C. 371 from International Patent Application No. PCT/US2008/110012, filed Mar. 13, 2008 and published on Sep. 18, 2008 as WO 2008/110012 A1, which claims the benefit of priority to U.S. Provisional Patent Application Ser. No. 60/894,587, filed Mar. 13, 2007 which applications are herein incorporated by reference in their entirety.

BACKGROUND OF THE INVENTION

Solar cells are currently utilized as an energy source by converting sunlight to electrical energy. Silicon is used almost exclusively as the semiconductor material in such photovoltaic cells. A significant limitation currently on the use of solar cells has to do with the cost of purifying silicon to solar grade. In view of current energy demands and supply limitations, there is an enormous need for a more cost efficient way of purifying metallurgical grade silicon (or any other silicon having higher impurities than solar grade) to solar grade silicon. U.S. Pat. No. 4,312,848 "Boron Removal in Silicon Purification" discloses the removal of boron from silicon through treatment of molten aluminum-silicon with a metal selected from the group consisting of titanium, vanadium or zirconium and gas injection. U.S. Pat. No. 4,312,849 "Phosphorous Removal in Silicon Purification" discloses the removal of phosphorous by bubbling a chlorine containing gas through the molten aluminum-silicon bath.

BRIEF DESCRIPTION OF THE FIGURES

FIG. 1 illustrates a block flow diagram of an exemplary process of the present invention, according to some embodiments.

DETAILED DESCRIPTION OF THE INVENTION

Reference will now be made in detail to certain claims of the invention, examples of which are illustrated in the accompanying structures and formulas. While the invention will be described in conjunction with the enumerated claims, it will be understood that they are not intended to limit the invention to those claims. On the contrary, the invention is intended to cover all alternatives, modifications, and equivalents, which may be included within the scope of the present invention as defined by the claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Definitions

Unless stated otherwise, the following terms and phrases as used herein are intended to have the following meanings:

In the methods of manufacturing described herein, the steps can be carried out in any order without departing from the principles of the invention, except when a temporal or operational sequence is explicitly recited. Recitation in a claim to the effect that first a step is performed, then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

As used herein, "multiple" refers to two or more, e.g., 2, 3, 4 or 5.

As used herein, "purifying" refers to the physical separation of a chemical substance of interest from foreign or contaminating substances.

As used herein, "contacting" refers to the act of touching, making contact, or of immediate proximity.

As used herein, "decanting" or "decantation" includes pouring off a fluid, leaving a sediment or precipitate, thereby separating the fluid from the sediment or precipitate.

As used herein, "separating" refers to the process of removing a substance from another (e.g., removing a solid or a liquid from a mixture). The process can employ any technique known to those of skill in the art, e.g., decanting the mixture, skimming one or more liquids from the mixture, centrifuging the mixture, filtering the solids from the mixture, or a combination thereof.

As used herein, "filtering" refers to the process of removing solids from a mixture by passing the liquid through a filter, thereby suspending the solids on the filter. Filtering may include a mechanical method to separate solids from liquids by passing the feed stream through a porous sheet such as a ceramic or metal membrane, which retains the solids and allows the liquid to pass through. This can be accomplished by gravity, pressure or vacuum (suction). The filtering effectively separates the sediment or precipitate from the liquid.

As used herein, "skimming" refers to the process of removing one or more liquids, solids of combination there of from a mixture, wherein the one or more liquids are floating on top of the mixture.

As used herein, "agitating" refers to the process of putting a mixture into motion with a turbulent force. Suitable methods of agitating include, e.g., stirring, mixing, and shaking.

As used herein, "precipitating" refers to the process of causing a solid substance (e.g., crystals) to be separated from a solution. The precipitating can include, e.g., crystallizing.

As used herein, "silicon" refers to the chemical element that has the symbol Si and atomic number 14. Measured by mass, silicon makes up 25.7% of the Earth's crust and is the second most abundant element on Earth, after oxygen. Pure silicon crystals are only occasionally found in nature; they can be found as inclusions with gold and in volcanic exhalations. Silicon is usually found in the form of silicon dioxide (also known as silica), and silicate. Silica occurs in minerals consisting of (practically) pure silicon dioxide in different crystalline forms (quartz, chalcedony, opal). Sand, amethyst, agate, quartz, rock crystal, flint, jasper, and opal are some of the forms in which silicon dioxide appears (they are known as "lithogenic", as opposed to "biogenic", silicas). Silicon also occurs as silicates (various minerals containing silicon, oxygen and one or another metal), for example feldspar. These minerals occur in clay, sand and various types of rock such as granite and sandstone. Asbestos, feldspar, clay, hornblende, and mica are a few of the many silicate minerals. Silicon is a principal component of aerolites, which are a class of meteoroids, and also is a component of tektites, which are a natural form of glass.

As used herein, "metallurgical grade silicon" (MG) refers to relatively pure (e.g., at least about 96.0 wt. %) silicon.

As used herein, "molten" refers to a substance that is melted, wherein melting is the process of heating a solid substance to a point (called the melting point) where it turns into a liquid.

As used herein, "solvent metal" refers to one or more metals, or an alloy thereof, which upon heating, can effectively dissolve silicon, resulting in a molten liquid. Suitable exemplary solvent metals include, e.g., copper, tin, zinc, antimony, silver, bismuth, aluminum, cadmium, gallium, indium, magnesium, lead, an alloy thereof, and combinations thereof.

As used herein, an "alloy" refers to a homogeneous mixture of two or more elements, at least one of which is a metal, and where the resulting material has metallic properties. The resulting metallic substance usually has different properties (sometimes significantly different) from those of its components.

As used herein, "liquidus" refers to a line on a phase diagram above which a given substance is stable in the liquid phase. Most commonly, this line represents a transition temperature. The liquidus may be a straight line, or it may be curved, depending upon the substance. The liquidus is most often applied to binary systems such as solid solutions, including metal alloys. The liquidus may be contrasted to the solidus. The liquidus and solidus do not necessarily align or overlap; if a gap exists between the liquidus and solidus, then within that gap, the substance is not stable as either a liquid or a solid.

As used herein, "solidus" refers to a line on a phase diagram below which a given substance is stable in the solid phase. Most commonly, this line represents a transition temperature. The solidus may be a straight line, or it may be curved, depending upon the substance. The solidus is most often applied to binary systems such as solid solutions, including metal alloys. The solidus may be contrasted to the liquidus. The solidus and liquidus do not necessarily align or overlap. If a gap exists between the solidus and liquidus, then within that gap, the substance is not stable as either a solid or a liquid; such is the case, for example, with the aluminum-silicon system.

As used herein "evolve" or "evolve a gas" refers to the process in which a liquid or solid will undergo a chemical reaction or decomposition to release a gas under certain conditions (typically high temperature).

As used herein, "dross" refers to a mass of solid impurities floating on a molten metal bath. It appears usually on the melting of low melting point metals or alloys such as tin, lead, zinc or aluminum, or by oxidation of the metal(s). It can be removed, e.g., by skimming it off the surface. With tin and lead, the dross can also be removed by adding sodium hydroxide pellets, which dissolve the oxides and form a slag. With other metals, salt fluxes can be added to separate the dross. Dross is distinguished from slag, which is a (viscous) liquid floating on the alloy, by being solid.

As used herein, "slag" refers to by-product of smelting ore to purify metals. They can be considered to be a mixture of metal oxides; however, they can contain metal sulphides and metal atoms in the elemental form. Slags are generally used as a waste removal mechanism in metal smelting. In nature, the ores of metals such as iron, copper, lead, aluminum, and other metals are found in impure states, often oxidized and mixed in with silicates of other metals. During smelting, when the ore is exposed to high temperatures, these impurities are separated from the molten metal and can be removed. The collection of compounds that is removed is the slag.

As used herein, "inert gas" refers to any gas, or combination of gases, that is not reactive under normal circumstances Unlike the noble gases, inert gases are not necessarily elemental and are often molecular gases. Like the noble gases, the tendency for non-reactivity is due to the valence, the outermost electron shell, being complete in all the inert gases. Exemplary inert gases include, e.g., helium (He), neon (Ne), argon (Ar) and nitrogen (N2).

As used herein, "rotary degasser" refers to an apparatus for removing impurities from molten metal that includes a degasser shaft, an impeller block and a coupling. The shaft is preferably hollow to allow for the passage of gas therethrough. The impeller block is connected to the degasser shaft, is typically formed of heat resistant material and has at least one metal-transfer recess, which displaces molten metal when the block is rotated. The block preferably includes at least one gas inlet in communication with the hollow portion of the degasser shaft and a gas-release opening formed in each metal-transfer recess. Each gas-release opening communicates with one of the gas inlets. The coupling connects the degasser shaft to a drive shaft and is formed of two or more coupling members.

As used herein, "vortex" refers to a spinning, often turbulent, flow (or any spiral motion) with closed streamlines. The shape of media or mass swirling rapidly around a center forms a vortex. It flows in a circular motion.

As used herein, the term "solar panel" refers to a photovoltaic module which is an assembly of solar cells used to generate electricity. In all cases, the panels are typically flat, and are available in various heights and widths. An array is an assembly of solar-thermal panels or photovoltaic (PV) modules; the panels can be connected either in parallel or series depending upon the design objective. Solar panels typically find use in residential, commercial, institutional, and light industrial applications.

The present invention provides a process that can be used as part of a relatively low cost method of purifying silicon aluminum mixtures by removing one or more of phosphorus and boron. The purified silicon aluminum mixtures may be further processed to remove aluminum and the purified silicon may be used in the manufacture solar cells, for example. The methods of the embodiments of the present invention relate to boron and phosphorus removal from silicon aluminum mixtures in less steps and less cost than traditional processes. For example, in one step of the method, the melt may be optionally cooled before removing the dross. In addition, the dross may be optionally re-heated prior to removal for more effective removal of boron and phosphorus while maintaining higher silicon and/or silicon aluminum mixture recovery yields. The removal of dross substantially prevents "back-contamination" of impurities in the melt.

Injection of chlorine gas directly into molten silicon has limitations due to the high temperature required to melt silicon (approximately 1410° C.). Additions of aluminium lower the melting temperature making lower temperature gas injection possible. This helps to minimize contamination from the equipment and furnace and prevent certain gases from forming at higher temperatures. Compounds formed with the chlorine or oxygen gas are also liquid or solid at the lower temperatures instead of gases. The present invention can be carried out on a large commercial scale (e.g., at least about 70 tons per year).

Referring to FIG. 1, a block flow diagram 100 of an exemplary process of purifying silicon is shown, according to some embodiments. A mixture 102 of aluminum and silicon may be heated 104 to form a melt 106. The melt 106 may be optionally cooled to a temperature above the solidus temperature, providing a cooled melt. The melt 106 may be contacted 108 with a gas comprising at least one of chlorine and oxygen. Dross may be removed 112 from the melt 110 in contact with a gas. The process removes at least one of boron or phosphorus from the aluminum-silicon mixture to provide purified aluminum-silicon mixture 114. Optionally, the dross may be heated above the liquidus of the melt prior to removal 112.

An aluminum and silicon mixture 102 may be heated 104 to provide a melt 106. The heating 104 may be at a temperature close to, at or above the liquidus temperature of the mixture to provide a melt 106. The melt 106 may be substantially liquid, a slush or completely liquid, for example. Heating 104 may be within about 100° C., about 50° C. or about 10° C. of the liquidus temperature, for example. The heating 104 may be at or above the liquidus temperature of the mixture 102, sufficient to provide a melt 106.

The mixture 102 may also include calcium. Calcium may reduce the amount of aluminum chloride ($AlCl_3$) fumes and may also help to reduce the phosphorus levels during gas contacting (e.g., injecting). The components other than silicon and contaminants in the mixture, act as a solvent for the silicon in the mixture 102. In addition to aluminum, one or more additional solvent metals may be present. For example, about 25% to about 70% silicon may be present and about 30% to about 75% aluminum. About 30% to about 60% or about 40% to about 50% silicon may also be present in the mixture. About 40% to about 65% or about 45% to about 55% aluminum may also be present, for example. In addition, aluminum-silicon mixtures may be combined with calcium-aluminum mixtures, titanium-aluminum mixtures, vanadium-aluminum mixtures, zirconium-aluminum mixtures, chromium-aluminum mixtures, hafnium-aluminum mixtures silicon dioxide, copper and sodium chloride and other salts, or any combination thereof, for example.

When the silicon to be purified is about 99.0 wt. % purity, aluminum may be commercial grade, e.g. 99.5 wt. % aluminum. Aluminum having 99.9 wt. % purity introduces less impurities to the system. Higher purity metallurgical grade silicon and/or aluminum may give better results but may increase the cost to achieve such higher purities. Further, it will be understood that aluminum-silicon type alloys containing large amounts of silicon may be used without adversely affecting the quality of purified silicon obtained from the process. However, other materials which would be regarded as impurities with respect to silicon should be controlled rather closely in certain instances in order that high purity silicon may be obtained economically.

Substantially all silicon crystals may be dissolved to get any phosphorus and boron into the melt 106 and out of the silicon crystals. An induction furnace, gas furnace or electric resistance furnace may be used. Graphite, silicon carbide, silicon carbide-alumina, alumina, fused silica, quartz or silicon nitride ($Si_3N_4$) material may be utilized for tools and rotary impeller or a combination of these materials. Non-phosphate bonded refractory may be used for the furnace lining or crucible. Approximately 25-70 wt % silicon may be present in the mixture 102 or alloy, before adding additional components. Lower concentrations of silicon may decrease the process yield and higher concentrations may cause increased dross and silicon loss during gas injection.

Aluminum with low impurity limits for iron, manganese, titanium etc. may be utilized. The phosphorus and boron levels may not need to be minimized, but higher levels may increase the time and cost to complete the process. One suggested alloy is P0404 or P1020 primary aluminum alloy which has low impurity limits and a reasonable cost.

Metallurgical silicon may be used with a low phosphorus and boron content. It is preferable that phosphorus and boron levels be minimized, as higher levels may increase the time and cost to complete the process. Metallurgical silicon may be used with about 14-135 ppm wt %, about 14-75 ppm wt % or about 14-30 ppm wt % phosphorus and about 4-50 ppm wt %, about 4-35 ppm wt % or about 4-15 ppm wt % boron. Aluminum (e.g., 1000 series) may be used with about 0.3-7 ppm wt %, about 0.5-5 ppm wt % or about 1-3.5 ppm wt % phosphorus or boron. Also, aluminum concentration may be varied.

Heating 104 may occur in a molten bath, sufficient to provide a molten liquid or melt 106. Heating 104 may include increasing the temperature of the bath above about 750° C., about 890° C. or about 1200° C., for example. If chlorine gas is not utilized to help lower the melt temperatures, higher temperatures may be needed to heat the mixture and subsequently contact with oxygen, for example. The temperature of the bath may be optionally lowered down to approximately 725-950° C., approximately 750-900° C. or approximately 600-1000° C. after the bath has been heated. The melt may be optionally cooled to a temperature between the solidus and liquidus temperature of the melt 106, for example. The temperature to lower the bath to may be dependent on the composition of the original mixture. The bath may be well mixed during the cool down so that the silicon crystals do not form on the walls of the furnace or the surface of the bath.

Any mixing, such as from a rotating impellor or from induction currents, may form a vortex, which may introduce oxygen in order to create dross high in boron. Contacting 108 the mixture with oxygen may be by mixing to form a vortex, for example. The formation of a vortex may also create more dross and may contaminate the melt 106 when boron or phosphorous diffuse out of the dross back and into the bath. The bath may be optionally cooled over approximately one hour or longer at a rate of about 30-150° C./hour. Optionally cooling the melt 106 before contacting with gas may help to improve the process by pushing the impurities out of the forming silicon crystals into the liquid part of the melt 106, where they can be removed. Mixing during cooling prevents the sides of the furnace from building up crystals and also helps to improve the purity of the forming crystals. As the crystals grow, the boundary layer between the growing silicon crystal and molten mixture becomes depleted in silicon. The mixing helps to prevent the depletion of silicon in this boundary layer, thereby improving the purity of the crystals.

A mixture of about 3-20%, about 4-15%, about 5-12% chlorine gas or oxygen and about 80-97%, about 84-93% or about 87-90% inert gas (e.g., argon, nitrogen or a combination thereof) may be contacted 108 with the melt 106, such as injecting through a rotary degassing device. A mixture of about 16 wt. % chlorine gas and about 84 wt. % of an inert gas may also be utilized. Chlorine gas, oxygen gas or a combination thereof may provide from about 3% to about 100%, about 5% to about 90%, about 15% to about 75% or about 20% to about 70% of a gas mixture. The remaining gas or gases may be inert gases, for example. After contacting 108 the melt 106 with chlorine or oxygen, the melt 110 may be further contacted with hydrogen, one or more inert gases or a combination thereof, for example. Sources of chlorine include gaseous chlorine ($Cl_2$), carbonyl chloride ($COCl_2$), hydrochloric acid (HCl) and carbon tetrachloride ($CCl_4$), for example. A solid blowing agent that evolves a gas or gas mixture may also be contacted 108 with the melt 110. Oxygen may also contact the melt 106 without contact from chlorine, such as by mixing. A higher concentration up to 100% chlorine gas may also be used. Hydrogen or hydrochloric acid gas, hydrochloric acid and/or water vapour or a combination of these gases may also be used. After contacting with chlorine or oxygen, the melt may be contacted with argon or nitrogen for about 15 minutes, about 30 minutes or for an hour or more.

In one embodiment, the molten liquid may contact the gas employing an apparatus configured to release a gas within the molten bath, such as a rotary degasser. A rotary degasser can effectively introduce the gas or gas mixture into the molten liquid. Additionally, a rotary degasser may effectively agitate (e.g., stir) the molten liquid while the gas is introduced into the molten liquid, creating relatively small bubbles. For example, the bubbles may be about 1-10 mm, about 2-8 mm or about 3-5 mm in diameter, on average.

If utilized, a rotary degasser may spin fast enough to inject fine bubbles into the melt. The degasser may operate at about 300-400 revolutions per minute (RPM), depending on the bath size and mixer design. The smaller the bubbles, the faster the reaction kinetics and the more efficient the phosphorus, boron and other impurity removal. Gas bubbles may be about 1-10 mm, about 2-8 mm or about 3-5 mm in diameter on average, for example. A graphite impeller and standard refractory used with aluminum (e.g., alumina refractory with low phosphorus) can be used without significant phosphorus contamination problems from the impeller and furnace walls. During the gas contacting, the rate of gas injection may be controlled to prevent excess gas usage. For example, a flow rate of about 0.5-9 l/min, about 2-7 l/min, or about 3-5 l/min may be utilized in various size furnaces. In furnaces of differing sizes, flow rate ranges may be adjusted accordingly (e.g, a flow rate of about 6 l/min in a 930 lb and about 3-5 l/m in a 250 lb furnace). Chlorine gas can be smelled and white aluminum chloride ($AlCl_3$) smoke can be seen when the gas is being injected too quickly. A fume hood may be preferably used to suck out any black or brown powder that forms around the impeller, this shaft minimizing dross sitting on the surface of the bath and helps prevent the phosphorus and boron from diffusing back into the bath from the dross. The excess dross that forms may be removed without removing the aluminum-silicon or silicon crystals in the melt. The mixer may be used to mix the dross into the bath to speed up the reaction rates without generating too much dross, but care must be taken not to contaminate the bath.

The chlorine gas may react with any magnesium, aluminum, strontium, sodium, calcium and/or other alkali metals or alkali earth metals in the melt to form salts. These salts may help to wet impurities in the melt that have formed compounds. It is believed that as the gas bubbles rise through the melt, the impurities such as $Ca_3P_4$, zirconium boride ($ZrB_2$), perboric acid ($HBO_3$), titanium diboride ($TiB_2$), $ZrAl_3+TiB_2$ agglomerates or calcium phosphate ($Ca_3(PO_4)_2$) stick to the surface of the bubble and are dragged to the surface of the melt where they can be removed with the dross. Magnesium, strontium, sodium and calcium concentrations are lowered in the bath from the formation of sodium chloride (NaCl), magnesium chloride (MgCl), calcium chloride ($CaCl_2$) and strontium chloride ($SrCl_2$) salts which float on the surface of the bath and may be removed with the dross as are other alkali metals or alkali earth metals salts formed with chlorides.

Potassium chloride-magnesium chloride (KCl—MgCl) salts may also be used to lower the phosphorus levels in the melt, but this may result in increased levels of magnesium in the melt, which may then be removed by chlorine injection into the molten bath. Using salts followed by a chlorine gas mixture can speed up the process by lowering the phosphorus quickly to lower levels. Other examples of such salts include sodium chloride (NaCl), sodium fluoride (NaF), sodium bicarbonate ($NaHCO_3$), sodium carbonate ($Na_2CO_3$), sodium oxide ($Na_2O$) and calcium fluoride ($CaF_2$) salts. It is possible to use higher levels of chlorine gas in the gas mixture, speeding up the process, but this may cause increased emissions that may require using increased pollution control equipment.

After the phosphorus and boron have been lowered to an acceptable level, the melt 110 may be optionally heated up close to or above the liquidus temperature and the dross removed 112. Removing 112 the dross at temperatures much lower than the liquidus may cause some removal of the silicon crystals as dross, since a dross strainer may remove dross and silicon crystals which both float near or on the surface of the bath. The cooled dross can be screened to separate the metal chucks, oxide powder and silicon crystals. The dross may subsequently be removed from the molten liquid, for example, using a skimmer. Typically, the dross may be a gray powder, semi-solid dross with oxides mixed with a mother liquor or black powder, located on the surface of the molten liquid. In one embodiment, the rotary degasser can create a vortex of the molten liquid, which can effectively mix the dross in the molten liquid. In such an embodiment, the vortex can contact oxygen to provide additional dross. The formed silicon crystals in the dross may also have low impurities.

Phosphorous may be reduced to about 0.1-20 ppm wt %; about 2-15 ppm wt % or below about 5 ppm wt %. Boron may be reduced to about 0.140 ppm wt %, about 0.5-5 ppm wt % or about 1-3.5 ppm wt %, for example. Strontium and calcium may be reduced to about 0.1-5 ppm wt about 0.5-3.5 ppm wt % or about 1-2.5 ppm wt % and magnesium may be reduced to below 10 ppm wt %, below about 8 ppm wt % or below about 5 ppm wt %; for example.

The process according to the present invention removes the boron to unexpectedly low levels for two reasons. It is believed the boron forms $TiB_2$ inclusions which get dragged to the surface of the bath. These inclusions are wet by the chlorine containing bubbles and by oxygen from the air that seems to react with the boron in the melt forming oxides with the boron. This means that the boron may be removed in an aluminum-silicon-calcium or aluminum-silicon melt by introducing a vortex which creates drosses rich in boron or by injecting gases comprising at least one of chlorine and oxygen directly into the aluminum-silicon-calcium or aluminum-silicon melt. Higher temperatures may accelerate the formation of dross and boron removal so this process may be performed at temperatures around 1000-1300° C. without chlorine injection. Either with or without Either with or without chlorine injection the process can remove boron from the melt down to about 0.1-10 ppm wt %, about 0.5-5 ppm wt % or about 1-3.5 ppm wt %.

The process may also be used to remove calcium, lithium, magnesium, strontium, aluminum, titanium and other elements with a higher affinity for oxygen or chlorine than silicon. This means that injection of an oxidizing gas ($CO_2$, $0_2$, etc.) or mixing to cause oxygen in the air to react with the aluminum silicon melt can be used to remove the aluminum solvent from the aluminum silicon mixtures as aluminum oxide or dross. The process of the present invention, or any step thereof, may be repeated one or more times to further remove boron, phosphorus or both. The process, or any step thereof, may be repeated using different equipment to reduce contamination, such as by using a second and subsequent furnaces for heating. The process may also be carried out on a commercial scale (e.g., using about 1000 lbs (453.592 kg) to about 40,000 lbs (18143.694 kg)) of mixture.

EXAMPLES

Example 1

A 210 lb. mixture of 30% silicon-70 wt % aluminum, made of low grade metallurgical silicon with approximately 120 ppm wt % phosphorus and 30 ppm wt % boron was mixed with scrap 1000 series electrical conducting aluminum wire resulting in a aluminum-silicon mixture with 19 ppm wt % boron and 90 ppm wt % phosphorus. The melt was heated up to 905°C. and lowered over 4 hrs with a graphite mixer to 725° C. A mixture of 3.5% chlorine gas and 96.5% nitrogen gas was injected for 11 hours at 4 l/min. Dross was carefully pulled off the surface of the bath to prevent thermiting dross during the gas injection. The temperature of the bath was then raised to 950° C. and the dross was removed from the molten bath. GDMS results indicated that the phosphorus level was 5.7 ppm wt % and the boron was 1.1 ppm wt % after 11 hrs of gas injection. The dross contained 650 ppm wt % phosphorus and 300 ppmwt boron. The first 3 hours lowered the phosphorus level from 90 to 50 ppm wt %. Calcium, strontium and magnesium were also significantly reduced. The process produced approximately 20 wt % dross as a by product.

Example 2

A mixture similar to example one was melted with KCl—MgCl salt on the surface for several hours and then tested. The resulting phosphorus level in the aluminum-silicon mixture was reduced to 20 ppm wt % from the initial 120 ppm wt % in the silicon.

Example 3

A mixture of 40% silicon and 60% aiuminum was heated up to 1200° C. and mixed with a silicon carbide rotor to create dross from oxygen in the air. The original bath had 19 ppmwt % in it and the resuiting dross had 590 ppmwt % boron in it.

Example 4

2.5 lbs of 10% calcium-90% aluminum master alloy was added to a 40% metallurgical grade silicon+60% primary aluminum in a 930 lb furnace. The mixture was heated to 950° C. until everything was molten. The bath was then cooled to 890° C. over 30 minutes while $N_2$ was injected into the bath through a rotary injector. 1 L/min chlorine gas and 5 L/min $N_2$ gas was then injected for four hours into the molten bath. The bath was then heated to 920° C. and the dross removed from the surface. Boron was between 1-5 ppmwt and phosphorus was between 10-20 ppmwt after treatment.

Example 5

5 lbs of 10% titanium-90% aluminum master alloy and 2.5 lbs of 10% zirconium-90% aluminum master alloy is added to a 40% metallurgical grade silicon+60% primary aluminum in a 930 lb furnace. The mixture is heated to 950° C. until everything is molten. The bath is then cooled to 890° C. over 30 minutes while $N_2$ is injected into the bath through a rotary injector. 1 L/min chlorine gas and 5 L/min $N_2$ gas is then injected for four hours into the molten bath. The bath is then heated to 920° C. and the dross is removed from the surface.

Example 6

5 lbs of 10% titanium-90% aluminum master alloy was added to a 40% metallurgical grade silicon+60% primary aluminum in a 930 lb furnace. The mixture was heated to 950° C. until everything was molten. The bath was then cooled to 890° C. over 30 minutes while $N_2$ was injected into the bath through a rotary injector. 1 L/min chlorine gas and 5 L/min $N_2$ gas was then injected for four hours into the molten bath. The bath was then heated to 920° C. and the dross removed from the surface. Boron was between 1-5 ppmwt and phosphorus was between 10-20 ppmwt after treatment.

Example 7

5 lbs of 10% vanadium-90% aluminum master alloy is added to a 40% metallurgical grade silicon+60% primary aluminum in a 930 lb furnace. The mixture is heated to 950° C. until everything is molten. The bath is then cooled to 890° C. over 30 minutes while $N_2$ is injected into the bath through a rotary injector. 1 L/min chlorine gas and 5 L/min $N_2$ gas is then injected for four hours into the molten bath. The bath is then heated to 920° C. and the dross is removed from the surface.

Example 8

40% metallurgical grade silicon+60% primary aluminum in a 930 lb furnace. The mixture was heated to 950° C. until everything was molten. The bath was then cooled to 890° C. over 30 minutes while $N_2$ was injected into the bath through a rotary injector which created a vortex. Chlorine and an inert gas were then injected for three hours followed by 5 L/min 2.5% hydrogen gas and 97.5% argon gas injected for three hours into the molten bath. The bath was then heated to 920° C. and the dross removed from the surface. Boron was between 1-5 ppmwt and phosphorus was between 10-20 ppmwt after treatment.

Example 9

5 lbs of silicon dioxide ($SiO_2$) was added to a 40% metallurgical grade silicon+60% primary aluminum in a 930 lb furnace. The mixture was heated to 950° C. until everything was molten. The bath was then cooled to 890° C. over 30 minutes while $N_2$ was injected into the bath through a rotary injector. 1 L/min chlorine gas and 5 L/min $N_2$ gas was then injected for four hours into the molten bath. The bath was then heated to 920° C. and the dross removed from the surface. Boron was between 1-5 ppmwt and phosphorus was between 10-20 ppmwt after treatment.

Example 10

2.5 lbs of 10% strontium-90% aluminum master alloy was added to a 40% metallurgical grade silicon+60% primary aluminum in a 930 lb furnace. The mixture was heated to 950° C. until everything was molten. The bath was then cooled to 890° C. over 30 minutes while $N_2$ was injected into the bath through a rotary injector. 1 L/min chlorine gas and 5 L/min $N_2$ gas was then injected for four hours into the molten bath. The bath was then heated to 920° C. and the dross removed from the surface. Boron was between 1-5 ppmwt and phosphorus was between 10-20 ppmwt after treatment.

Example 11

175 lbs of copper was added to a 40% metallurgical grade silicon+60% primary aluminum in a 930 lb furnace. The mixture was heated to 950° C. until everything was molten. The bath was then cooled to 890° C. over 30 minutes while $N_2$ was injected into the bath through a rotary injector. 1 L/min chlorine gas and 5 L/min $N_2$ gas was then injected for four hours into the molten bath. The bath was then heated to 920° C. and the dross removed from the surface. Boron was between 1-5 ppmwt and phosphorus was between 10-20 ppmwt after treatment.

Example 12

40% metallurgical grade silicon+60% primary aluminum in a 930 lb furnace. The mixture was heated to 950° C. until everything was molten. The bath was then cooled to 890° C. over 30 minutes while $N_2$ was injected into the bath through a rotary injector. 1 L/min chlorine gas and 5 L/min $N_2$ gas was then injected for four hours into the molten bath. The bath was then heated to 920° C., $N_2$ was injected for 30 minutes and the bath was heated to 950° C. before the dross was removed from the surface. Boron was between 1-5 ppmwt and phosphorus was between 10-20 ppmwt after treatment.

Example 13

40% metallurgical grade silicon+60% primary aluminum in a 930 lb furnace. The mixture was heated to 950° C. until everything was molten. The bath was then cooled to 890° C. over 30 minutes while $N_2$ was injected into the bath through a rotary injector. 20% L/min oxygen gas and 80% argon gas was then injected for four hours into the molten bath. The bath was then heated to 920° C. $N_2$ was injected for 30 minutes and the dross removed from the surface. Boron was between 1-5 ppmwt and phosphorus was between 10-20 ppmwt after treatment.

Example 14

40% metallurgical grade silicon+60% primary aluminum in a 930 lb furnace. The mixture was heated to 950° C. until everything was molten. The bath was then cooled to 890° C. over 30 minutes while $N_2$ was injected into the bath through a rotary injector. 20% L/min oxygen gas and 80% argon gas was then injected for four hours into the molten bath then 1 L/min chlorine gas and 5 L/min $N_2$ gas was then injected for four hours into the molten bath. The bath was then heated to 920° C. $N_2$ was injected for 30 minutes and the dross removed from the surface. Boron was between 1-5 ppmwt and phosphorus was between 10-20 ppmwt after treatment.

Example 15

40% metallurgical grade silicon+60% primary aluminum in a 930 lb furnace. The mixture is heated to 950° C. until everything is molten. The bath is then cooled to 890° C. over 30 minutes while $N_2$ is injected into the bath through a rotary injector. 20% L/min $CO_2$ gas and 80% argon gas is then injected for four hours into the molten bath then 1 L/min chlorine gas and 5 L/min $N_2$ gas is then injected for four hours into the molten bath. The bath is then heated to 920° C. $N_2$ is injected for 30 minutes and the dross is removed from the surface.

Example 16

201 lbs of high purity sodium chloride (NaCl) to surface of 40% metallurgical grade silicon +60% primary aluminum in a 930 lb furnace. The mixture is heated to 950° C. until everything is molten. The bath is then cooled to 890° C. over 30 minutes while $N_2$ is injected into the bath through a rotary injector. 1 L/min chlorine gas and 5 L/min $N_2$ gas is then injected for four hours into the molten bath. The bath is then heated to 920° C. $N_2$ is injected for 30 minutes and the dross is removed from the surface. The molten bath is then poured through a ceramic foam filter.

Example 17

40% metallurgical grade silicon+60% primary aluminum in a 930 lb furnace. The mixture is heated to 950° C. until everything is molten. The bath is then cooled to 890° C. over 30 minutes while $N_2$ is injected into the bath through a rotary injector. 1 L/min chlorine gas and 5 L/min $N_2$ gas is then injected for four hours into the molten bath. The bath is then heated to 920° C., $N_2$ is injected for 30 minutes and the bath is heated to 950° C. before the dross is removed from the surface. The molten bath is then poured through a ceramic foam filter.

What is claimed is:

1. A process for removing phosphorous and boron from metallurgical grade silicon, the method comprising:
    a) heating a mixture of aluminum, metallurgical grade silicon, and at least one of calcium, titanium, vanadium, zirconium, chromium, hafnium, silicon dioxide, and sodium chloride, with greater than the eutectic composition of silicon, to form a melt, wherein the metallurgical grade silicon comprises about 14-135 ppmwt phosphorus and about 4-50 ppmwt boron;
    b) cooling the melt to a temperature above the solidus temperature;
    c) contacting the melt with a gas comprising oxygen, present in about 15 wt. % to about 75 wt. % of the gas, such that a vortex is formed in the melt, wherein the vortex is at least at the surface of the melt, wherein the gas is injected using a rotary impeller, wherein the oxygen contacts the melt, without chlorine, and,
    d) removing dross present in the melt;
    wherein the process removes boron and phosphorus from silicon, wherein the phosphorus is reduced to about 0.1-20 ppmwt, and the boron is reduced to about 0.1-10 ppmwt,
    wherein the process optionally further removes at least one of calcium, lithium, magnesium, strontium, aluminum, and titanium contained in the metallurgical grade silicon,
    wherein the silicon that is obtained from the process is used in the manufacture of solar cells.

2. The process of claim 1, wherein the melt is cooled to a temperature between the solidus and liquidus temperature.

3. The process of claim 1, wherein removing the dross comprises heating the melt above the liquidus temperature.

4. The process of claim 1, wherein contacting the cooled melt with a gas comprises injecting.

5. The process of claim 1, wherein metallurgical silicon and 1000 series aluminum are used, wherein the mixture comprises about 25-70 wt. % silicon, or a combination thereof.

6. The process of claim 1, wherein the phosphorous is reduced to about 2-15 ppmwt, wherein the boron is reduced to about 0.1-10 ppmwt, or a combination thereof.

7. The process of claim 1, further comprising contacting the melt with one or more salts to lower the impurity levels.

8. The process of claim 4, wherein the gas mixture is injected between the solidus and liquidus temperature of the melt.

9. The process of claim 1, wherein the rotary impeller is manufactured from graphite, silicon carbide, silicon carbide-alumina, alumina, fused silica, quartz or silicon nitride ($Si_3N_4$) material.

10. The process of claim 1, further comprising after removing the dross present in the melt, contacting the melt with argon or nitrogen.

11. The process of claim 1, further comprising removing aluminum from the aluminum-silicon mixture.

12. The process of claim 1, wherein the process is carried out using about 1000 lbs (453.592 kg) to about 40,000 lbs (18143.694 kg) of mixture.

13. A process for removing phosphorous and boron from silicon, the method comprising:
    a) heating, a mixture of aluminum, metallurgical grade silicon, and at least one of calcium, titanium, vanadium, zirconium, chromium, hafnium, silicon dioxide, and sodium chloride, with greater than the eutectic composition of silicon, to form a melt, wherein the metallurgical grade silicon comprises about 14-135 ppmwt phosphorus and about 4-50 ppmwt boron;
    b) cooling the melt to a temperature above the solidus temperature and below the liquidus temperature;
    c) contacting the cooled melt with a gas comprising oxygen, such that a vortex is formed in the melt, wherein the vortex is at least at the surface of the melt, wherein the gas is injected using a rotary impeller, wherein the oxygen is present in about 15 wt. % to about 75 wt. % of the gas, and wherein the oxygen contacts the melt, without chlorine;
    d) heating the dross above the liquidus temperature of the melt;
    e) removing dross present in the melt;
    wherein the process removes boron and phosphorus from silicon, wherein the phosphorus is reduced to about 0.1-20 ppmwt, and the boron is reduced to about 0.1-10 ppmwt,
    wherein the process optionally further removes at least one of calcium, lithium, magnesium, strontium, aluminum, and titanium contained in the silicon.

14. The process of claim 1, wherein the remaining gas or gases is an inert gas or gases.

15. The process of claim 1, after the contacting the melt with the gas comprising oxygen, further comprising contacting the melt with hydrogen, one or more inert gases, or a combination thereof.

16. The process of claim 1, after the contacting the melt with the gas comprising oxygen, further comprising contacting the melt with hydrogen or hydrochloric acid gas, hydrochloric acid and/or water vapor, or a combination of these gases.

17. The process of claim 1, wherein phosphorus is reduced to below about 5 ppmwt.

18. The process of claim 1, wherein boron is reduced to about 1-3.5 ppmwt.

19. The process of claim 1, wherein the strontium and calcium is reduced to about 0.1-5 ppmwt.

20. The process of claim 1, wherein the magnesium is reduced to below about 10 ppmwt.

21. The process of claim 1, which is repeated one or more times.

22. The process of claim 1, wherein the gas is introduced into the molten liquid, creating bubbles about 1-10 mm in diameter, on average.

23. The process of claim 1, wherein after the contacting the melt with the gas comprising oxygen, further comprising contacting the melt with argon or nitrogen for about 15 minutes or more.

* * * * *